(12) United States Patent
Markley

(10) Patent No.: US 7,097,579 B2
(45) Date of Patent: Aug. 29, 2006

(54) PIVOTING CHAIN GUIDE AND TENSIONER ASSEMBLY

(75) Inventor: George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 335 days.

(21) Appl. No.: 10/685,849

(22) Filed: Oct. 15, 2003

(65) Prior Publication Data

US 2005/0085322 A1   Apr. 21, 2005

(51) Int. Cl.
F16H 7/08   (2006.01)
F16H 7/18   (2006.01)

(52) U.S. Cl. .................. 474/111; 474/140; 474/101

(58) Field of Classification Search ............... 474/101, 474/109, 111, 140, 134
See application file for complete search history.

(56) References Cited

U.S. PATENT DOCUMENTS

| | | | |
|---|---|---|---|
| 1,777,527 A | 10/1930 | Morse | |
| 1,988,421 A | 1/1935 | McCann et al. | 64/5 |
| 2,210,276 A | 8/1940 | Bremer | 74/242.11 |
| 2,261,316 A | 11/1941 | Weller | 74/242.11 |
| 4,395,251 A * | 7/1983 | King et al. | 474/111 |
| 4,662,862 A * | 5/1987 | Matson | 474/101 |
| 4,798,562 A * | 1/1989 | Matson et al. | 474/101 |
| 5,049,114 A * | 9/1991 | Hayden | 474/111 |
| 5,055,088 A * | 10/1991 | Cradduck et al. | 474/111 |
| 5,180,340 A | 1/1993 | Vahabzadeh et al. | 474/111 |
| 5,221,236 A * | 6/1993 | Raymer et al. | 474/109 |
| 5,425,680 A * | 6/1995 | Young | 474/111 |
| 5,702,318 A | 12/1997 | Hayafune et al. | 474/111 |
| 5,797,818 A | 8/1998 | Young | 474/111 |
| 5,967,922 A | 10/1999 | Ullein et al. | 474/111 |
| 5,984,815 A * | 11/1999 | Baddaria | 474/111 |
| 6,117,034 A * | 9/2000 | Vine | 474/134 |
| 6,179,740 B1 * | 1/2001 | Walker | 474/134 |
| 6,238,311 B1 * | 5/2001 | Cutting | 474/140 |
| 6,322,470 B1 | 11/2001 | Markley et al. | 474/111 |
| 6,354,972 B1 * | 3/2002 | Young | 474/101 |
| 6,358,169 B1 | 3/2002 | Markley | 474/111 |
| 6,623,391 B1 * | 9/2003 | Young et al. | 474/111 |
| 2002/0045503 A1 | 4/2002 | Young et al. | 474/111 |

FOREIGN PATENT DOCUMENTS

| | | |
|---|---|---|
| DE | (4013190 A1 * | 11/1990 |
| EP | (0581219 A1 * | 2/1994 |
| JP | 2003-074652 | 3/2003 |
| WO | WO (97/37154 A1 * | 10/1997 |

* cited by examiner

*Primary Examiner*—Marcus Charles
(74) *Attorney, Agent, or Firm*—Brown & Michaels, PC; Greg Dziegielewski

(57) ABSTRACT

A pivoting chain guide and tensioner assembly for use with an endless chain loop comprising: at least one bracket plate, a tensioner attached to the at least one bracket plate, and a guide attached to the bracket plates. The bracket plate surrounds the chain at least partially between a driving and a driven sprocket and at least one of the plates has a hole for a pivot at a center axis. The tensioner comprises a tensioner arm with a chain sliding face for contacting the outside of the chain and a biasing means. The guide has a chain sliding face that contacts the outside of the chain. When a high local load is applied to the chain, the load is received by the end of the guide, forcing the guide to move away from the chain, such that the bracket plate pivots, moving the tensioner relative to the chain.

9 Claims, 11 Drawing Sheets

PIVOTING CHAIN GUIDE AND TENSIONER ASSEMBLY

BACKGROUND OF THE INVENTION

1. Field of the Invention

The invention pertains to the field of tensioners. More particularly, the invention pertains to a tensioner that has damping.

2. Description of Related Art

FIG. 1 shows a prior art chain driving system having a blade tensioner and a guide. A closed loop chain encircles driving sprocket 12 and driven sprocket 10. Each sprocket 10, 12 accelerates and decelerates independently while maintaining forward motion. A fixed guide 14 is attached to a bracket 7 on the tight strand of the chain. Opposite the guide 14 on the slack strand of the chain is a tensioner 16, which is at least semi-rigidly fixed to the bracket 7 and biased towards the tight strand of the chain. Bolts 18 fasten the bracket containing the tensioner 16 and the guide 14 to the engine block (not shown).

When the driving sprocket 12 accelerated or the driven sprocket 10 decelerates, an energy wave or high local load is created in the tight strand of the chain, which travels from the sprocket that changed in velocity toward the other sprocket. The chain 8 attempts to span the distance between the link of the chain in contact with the initiating sprocket to the other sprocket in the shortest possible distance, a straight line. The energy moves through the links on the free strand of the chain until it comes to the end of the guide 14, which absorbs the energy. As a result from the constant absorption of the high local load the ends of the guide 14 sustains significant wear. The energy wave would be present and show the same characteristics if it was to originate on the slack strand of the chain, although the wave energy may not occur at all depending on how well the tensioner keeps the slack out of the chain and how much damping the tensioner has.

One solution to reduce the load that results in the prior art chain driving system is to add damping to the tensioner. One problem associated with adding the required damping to a tensioner is that if the tensioner is softened significantly, it may result in a loss of chain control, since tensioners are specifically designed to apply just enough force to provide adequate chain control. Other solutions are shown in U.S. Pat. Nos. 5,180,340, 5,797,818, and 5,976,922, 6,322,470, as well as U.S. application Ser. No. 2002-0045503 and Japanese Application No. 2003-047652.

U.S. Pat. No. 5,180,340 discloses a coil spring attached to a block on the slack side and tight side of the chain that biases an ejector/apex which is located on the inside side of the chain. As force is applied to the ejector/apex, the ejector pivots against the biasing action of the coil spring to swing toward the adjacent sprocket.

U.S. Pat. No. 5,797,818 discloses a chain assembly with reduced noise and vibration on the slack side of the chain comprising a blade shoe, a spring, and a resilient damping device. The shoe is pivotally mounted to the tensioner bracket. The spring is mounted to the shoe and biases the shoe towards the chain. The resilient damping device is mounted between the tensioner bracket and the spring to aid in controlling the vibration that occurs during valve events.

U.S. Pat. No. 5,976,922 discloses a tensioning device comprising a tension lever that has first and second slide blocks affixed, such that the slide blocks are on either side of the slack side of chain. The first slide block is pivotally attached to a guide rail on the tight side of the chain. The second slide block is biased against one of the sides of the slack side of the chain by a tension element comprising a compression spring and a piston.

U.S. Pat. No. 6,322,470 discloses a tensioner that includes a pair of pivoting arms used to simultaneously tension two separate strands of the same chain. A lever with fixed pins is located between the two strands. The arms extend outside the strands of the chain and carry shoes positioned to contact the outside portion of the chain are pivotally mounted to the fixed pins. Rotation of the lever causes the fixed pins to move laterally and the arms draw inward and tension is imparted to the separate chain strands at the same time. In other words, a high load on one side of the chain tries to transfer to the other side of the chain but the load eventually evens out.

US 2002-0045503 discloses a chain tensioner that has a blade and spring assembly. The blade has a first end and a second end. The first end defines a hub. The hub is connected to the central portion of the blade shoe and a first end wall and defines a bore that receives a pin that pivotably connects the blade to a mounting bracket.

Japanese Application No. 2003-074652 discloses a tensioner in which a support member is turnably pivoted on a center line connected the two sprockets. Attached to the support member are pressing members on either side of the chain at the same time. The damping that occurs of the slack and tight side of the chain is individual to each side of the chain, since each of the pressing members floats relative to the chain. While there is only one pivot present between the two pressing members, the load on one tries to affect the other and the pressing members undulate back and forth on the chain.

SUMMARY OF THE INVENTION

A pivoting chain guide and tensioner assembly for use with an endless chain loop drivingly connected to a driving sprocket comprising: at least one bracket plate, a tensioner semi-rigidly attached to the at least one bracket plate, and a guide rigidly attached to the at least one bracket plate. The bracket plate surrounds the chain at least partially between the driving sprocket and the driven sprocket and at least one of the bracket plates has a receiving hole for a pivot at a center axis. The at least one bracket plate may pivot clockwise or counterclockwise two degrees.

If two bracket plates are present, at least one of bracket plates contains holes for receiving bolts that attach the bracket plate to the engine block. The remaining bracket plate may pivot clockwise or counterclockwise two degrees relative to the other bracket plate.

The tensioner comprises a tensioner arm with a chain sliding face for contacting the outside of the chain and a biasing means that biases the tensioner arm towards the chain. The guide has a chain sliding face that contacts the outside of the chain.

When a high local load is applied to the chain, the load is received by the end of the guide, forcing the guide to move away from the chain, such that the plurality of bracket plates or the at least one bracket plate pivots on the pivot, moving the tensioner relative to the chain.

DETAILED DESCRIPTION OF THE INVENTION

Figure 1:
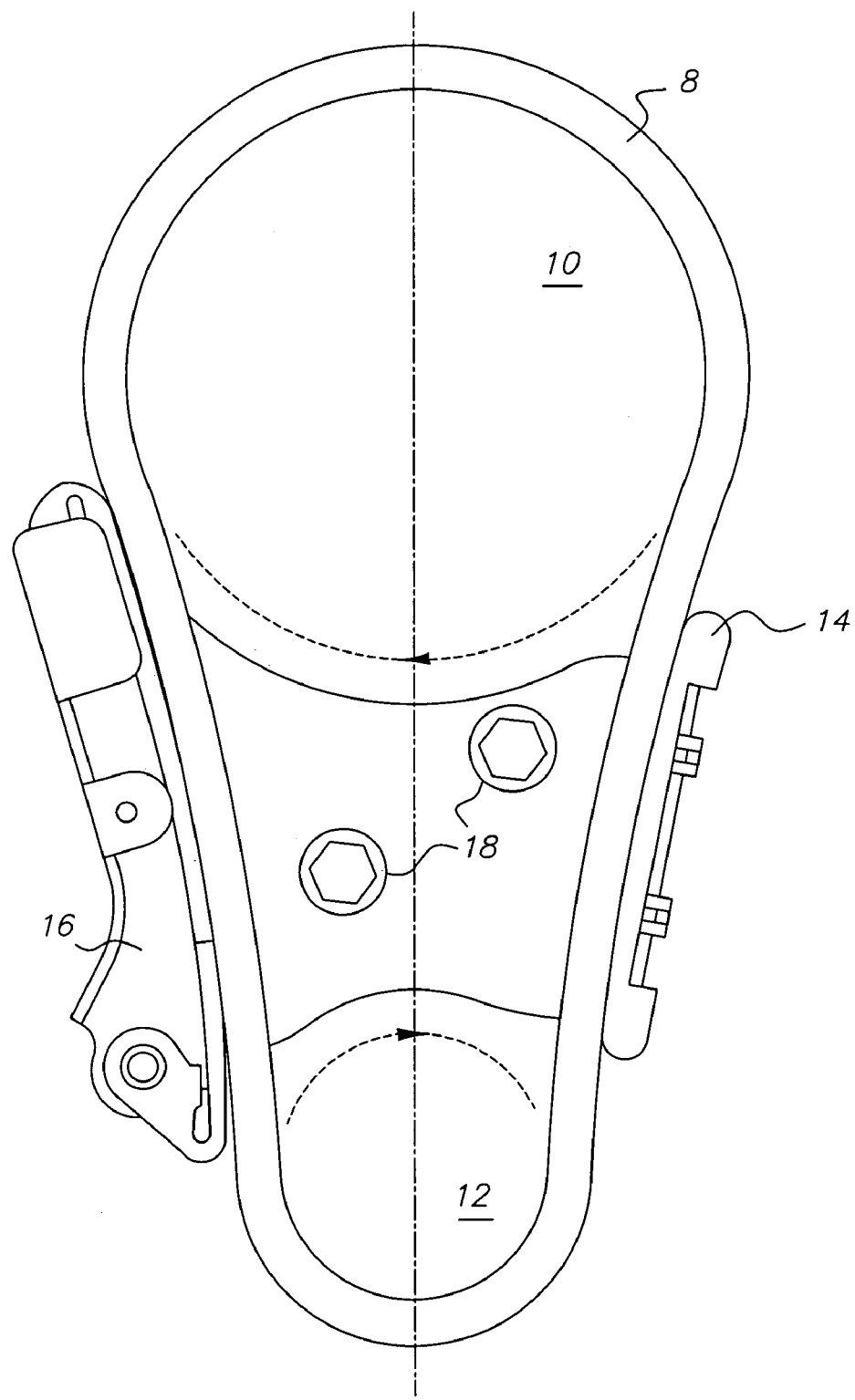
FIG. 1 shows a schematic of a prior art chain driving system.
Figure 2:
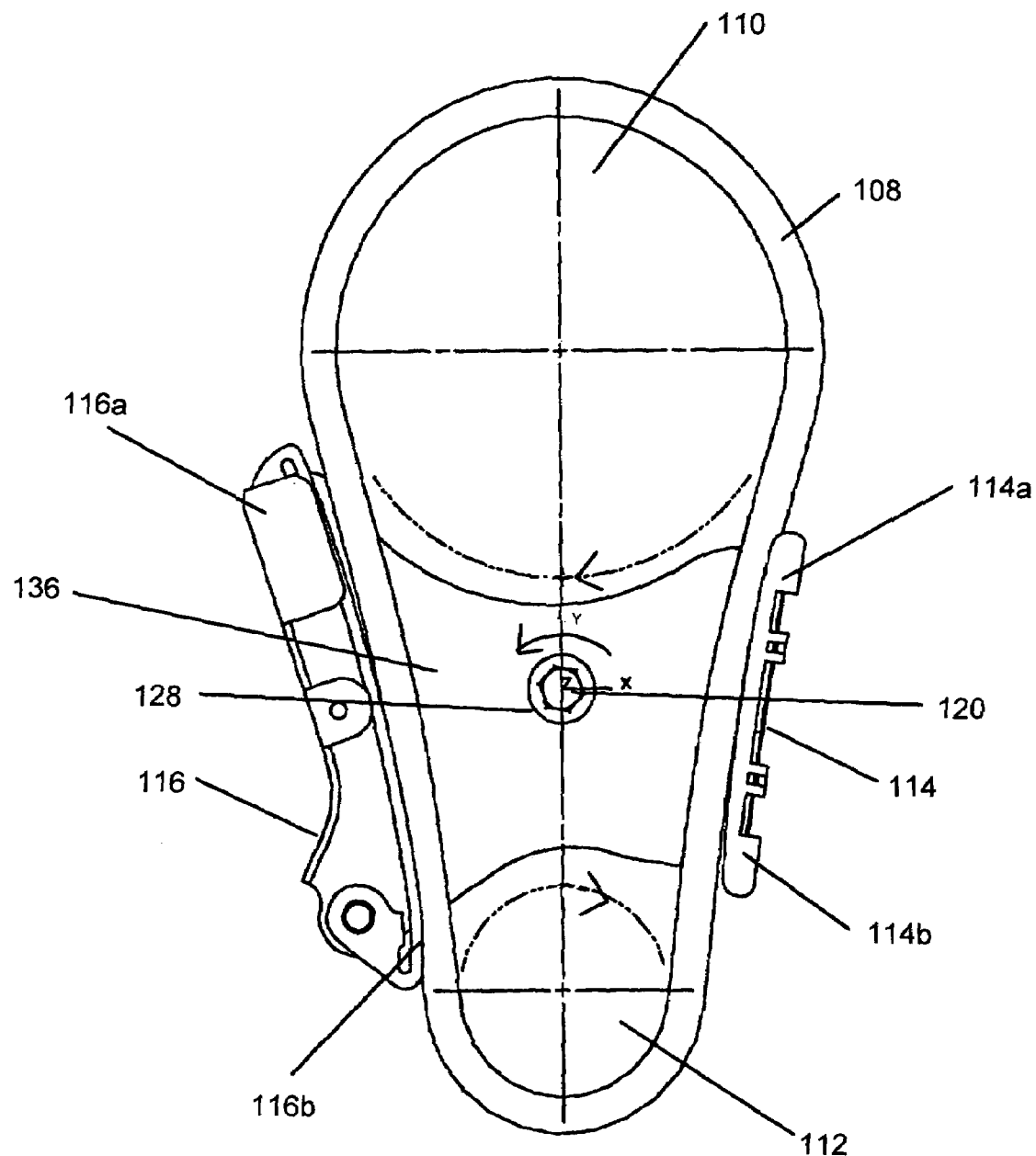
FIG. 2 shows a schematic of a single bracket plate pivoting control system shifted two degrees clockwise.
Figure 3:
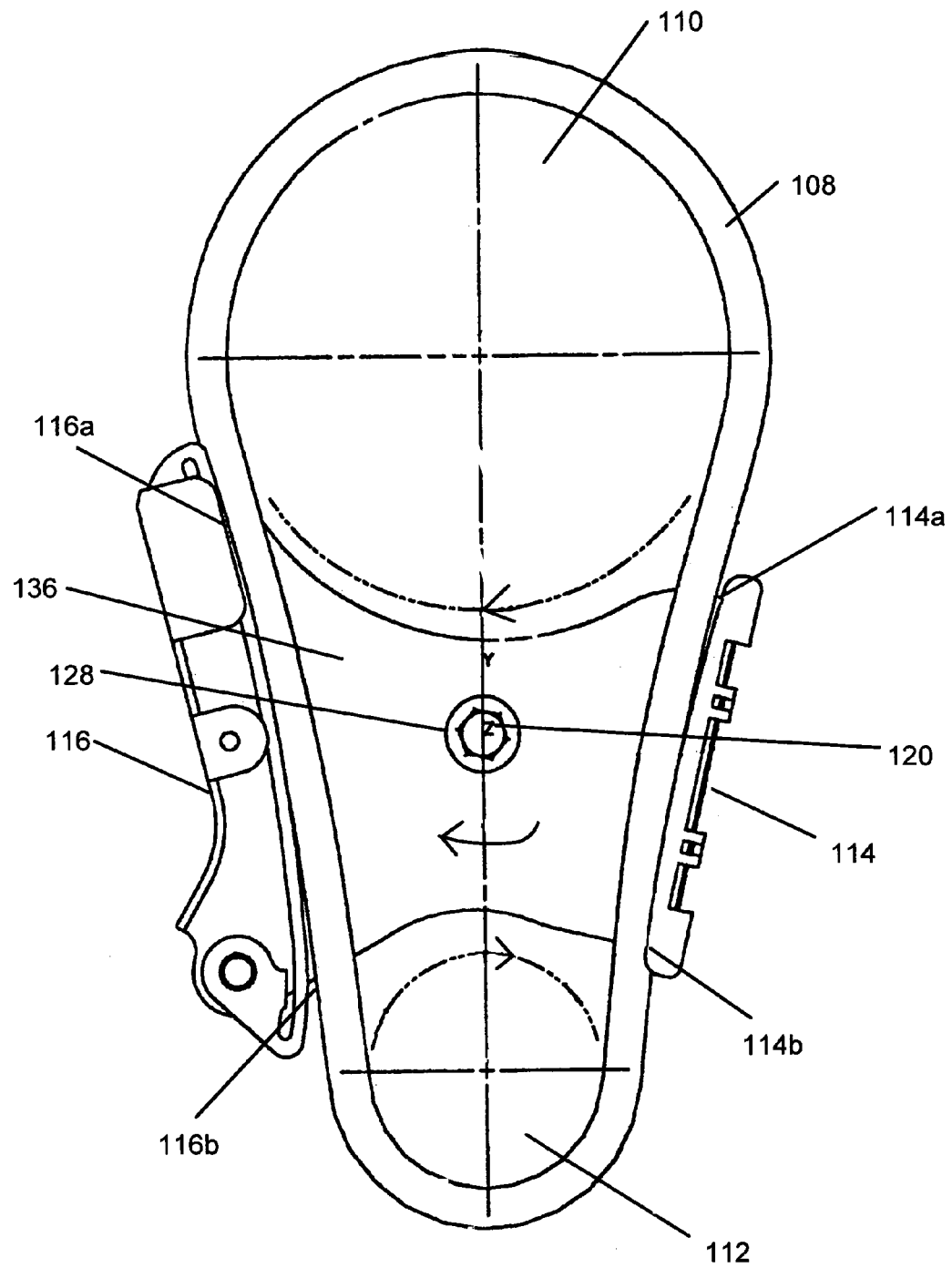
FIG. 3 shows a schematic of a single bracket pivot control system shifted two degrees counterclockwise.
Figure 10A:
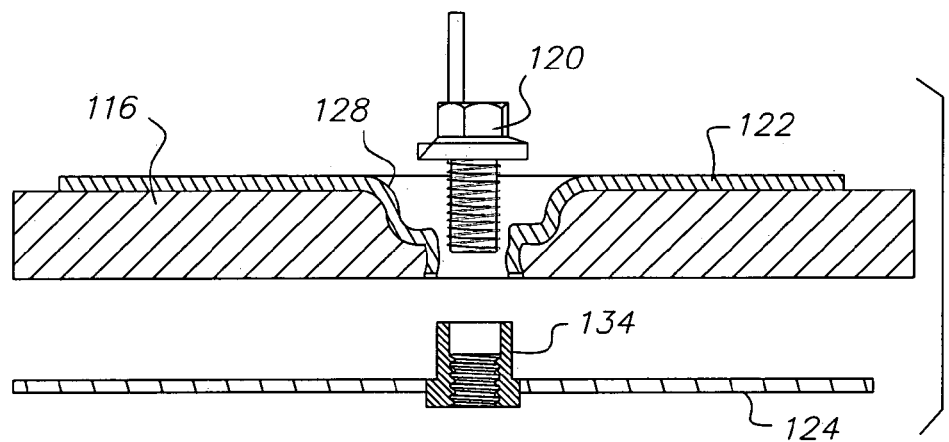
FIG. 10a and 10b, cross sections of FIG. 9, show the interaction between the two bracket plates of the dual bracket pivot control system.
Figure 10B:
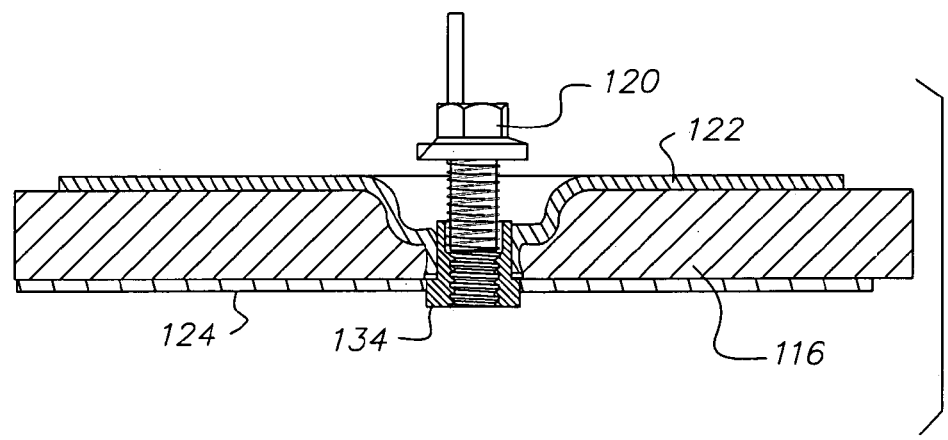
Figure 11:
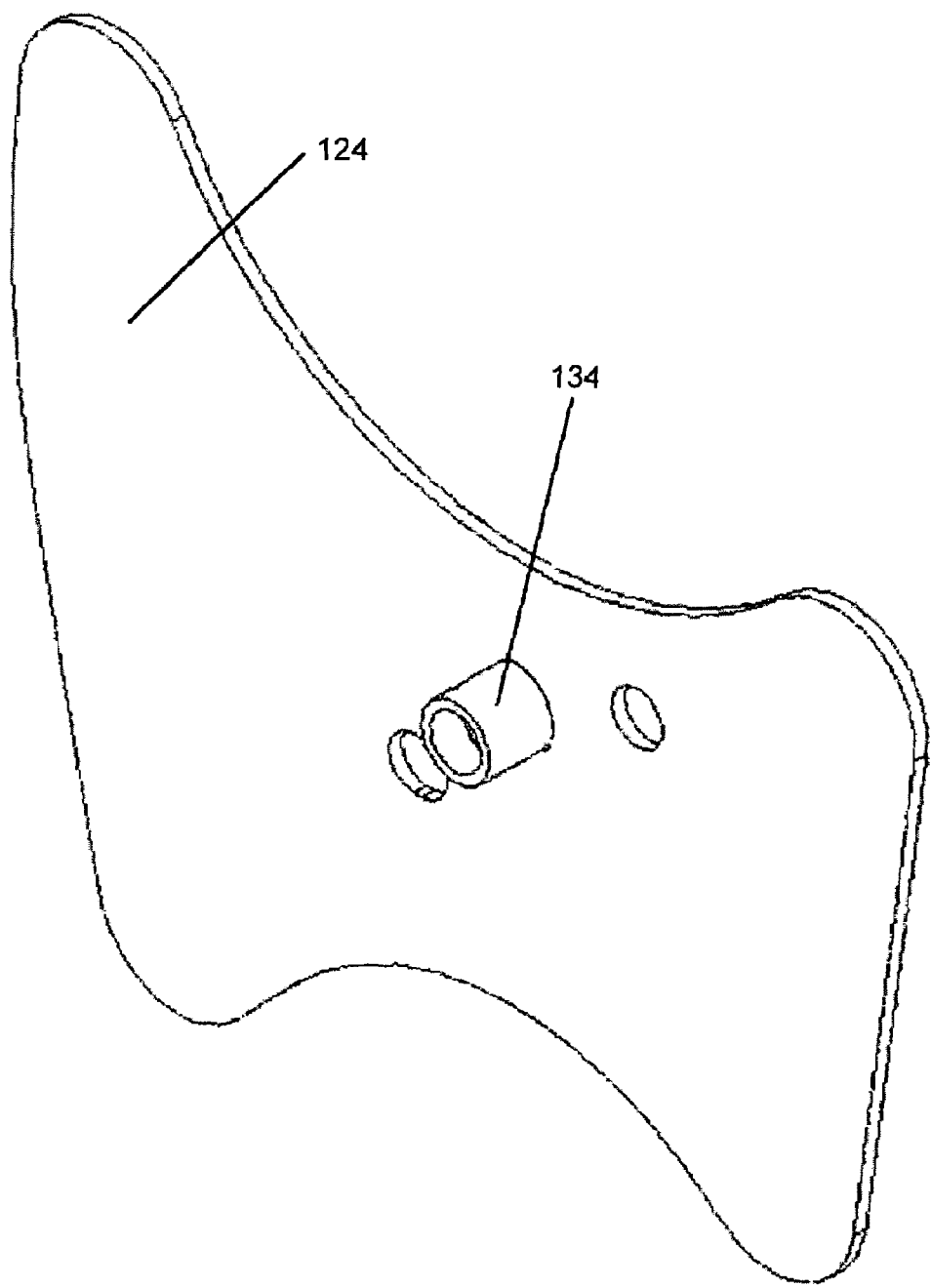
FIG. 11 shows a perspective view of the second bracket plate of the dual bracket pivot control system.

FIGS. 2 and 3 show a single bracket 136 pivot control system. FIG. 2 shows the bracket 136 pivoting counterclockwise and FIG. 3 shows the bracket 136 pivoting clockwise. With the single bracket pivot control system it is assumed that the engine block (not shown) contains a pivot similar to that shown in FIGS. 10a, 10b, and 11 and identified as reference numeral 134. The single bracket plate 136 has a central receiving hole 128 containing a screw or pivot means 120, which engages the pivot, which is part of the engine block, allowing the bracket plate 136 to pivot clockwise or counterclockwise.

When the driving sprocket 112 or the driven sprocket 110 decelerates, the chain 108 will attempt to span the distance between the link of the chain in contact with the initiating sprocket to the other sprocket in the shortest distance possible, a straight line. The energy wave or high local load moves through the links of the chain until it comes to the end of the guide 114, as in the prior art discussed above. However, unlike in the prior art, the energy causes the end of the guide 114a, which is rigidly fixed to the bracket plate 136 to move away from the tight strand of the chain 108. The movement of the end of the guide 114a causes the bracket plate 136 to pivot clockwise relative to the engine block, causing the end of the guide 114b to move towards the tight strand of the chain, the end of the tensioner 116b closest to the driving sprocket 112 to move away from the slack strand of the chain and the opposite end of the tensioner 116a, closest to the driven sprocket 110 to move towards the slack strand of the chain 108. The movement of the bracket plate 136 equalizes the energy between both ends of the guide 114a, 114b and allows damping of the chain 108 to take place without compromising the tensioner 116. The specific movement of the chain 108 is not shown.

Similarly, if the high local load was received by the end of the tensioner 116b, closest to the driving sprocket 112 and caused the end of the tensioner to move away from the slack side of the chain, this in turn would cause the bracket plate 136 to pivot clockwise relative to the engine block, resulting in the opposite side of the tensioner 116a moving towards the slack strand of the chain, the end of the guide 114a, closest to the driven sprocket 110 to move away the tight strand of the chain, and the opposite side of the guide 114b to move towards from the tight strand of the chain.

When the driving sprocket 112 or the driven sprocket 110 accelerates, the chain 108 will attempt to span the distance between the link of the chain 108 in contact with the initiating sprocket to the other sprocket in the shortest distance possible, a straight line. The energy wave or high local load moves through the links of the chain until it comes to the end of guide 114, as in the prior art discussed above. However, unlike in the prior art, the energy causes the end of the guide 114b, which is rigidly fixed to the bracket plate 136 to move away from the tight strand of the chain 108. The movement of the end of the guide 114b causes the bracket plate 136 to pivot counterclockwise relative to the engine block, causing the end of the guide 114a to move towards the tight strand of the chain, the end of the tensioner 116b closest to the driving sprocket 112 to move towards the slack strand of the chain and the opposite end of the tensioner 116a, closest to the driven sprocket 110 to move away from the slack strand of the chain 108. The movement of the bracket plate 136 equalizes the energy between both ends of the guide 114a, 114b and allows damping of the chain 108 to take place without comprising the tensioner 116. The specific movement of the chain 108 is not shown.

Similarly, if the high local load was received by the end of the tensioner 116a, closest to the driven sprocket and caused the end of the tensioner to move away from the slack side of the chain, this in turn would cause the bracket plate 136 to pivot counterclockwise relative to the engine block resulting in the opposite side of the tensioner 116b moving towards the slack strand of the chain, the end of the guide 114a, closest to the driven sprocket 110 to move towards the tight strand of the chain, and the opposite side of the guide 114b to move away from the tight strand of the chain.

Figure 4:
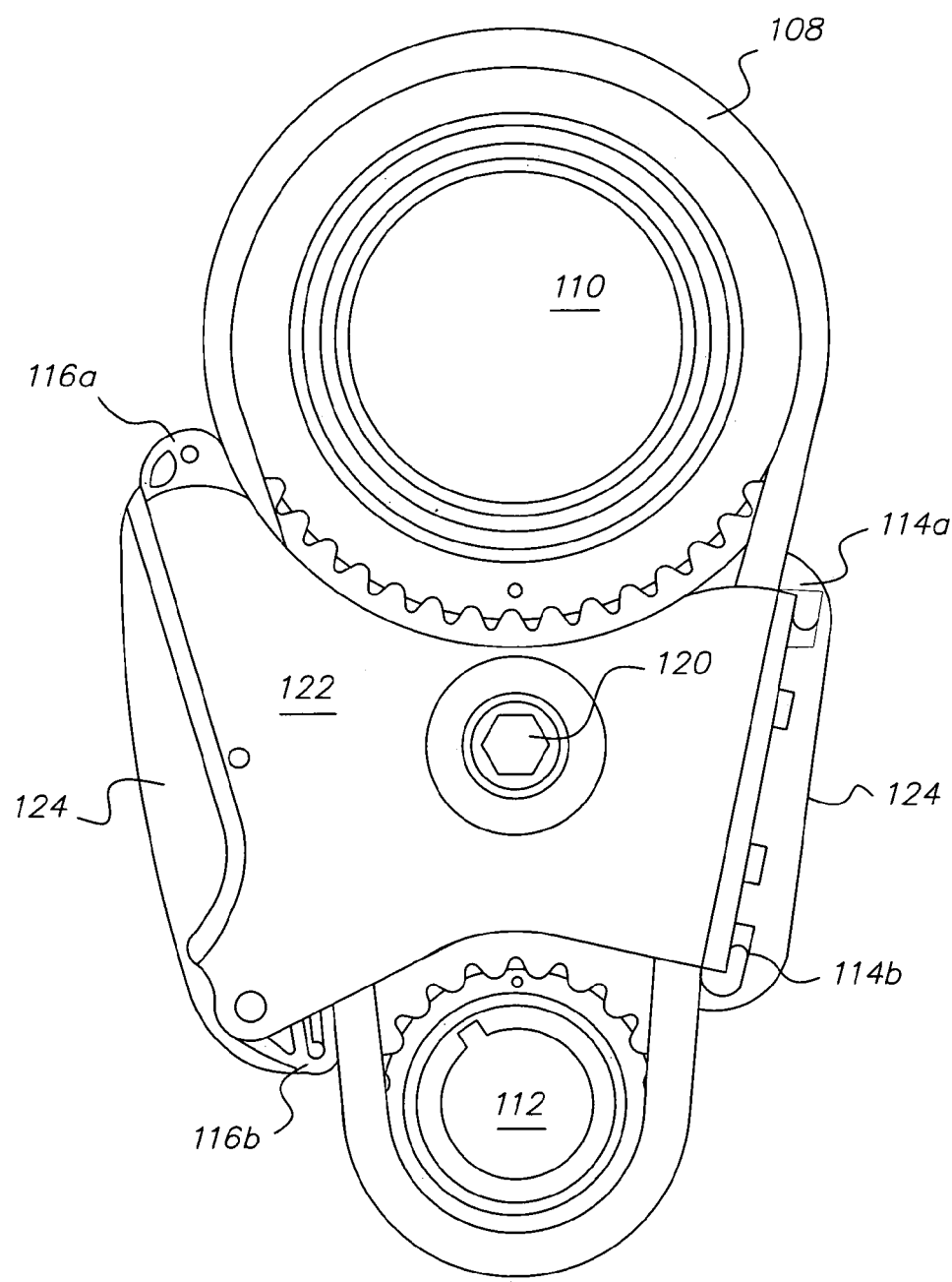
FIG. 4 shows a schematic of a dual bracket pivot control system.
Figure 5:
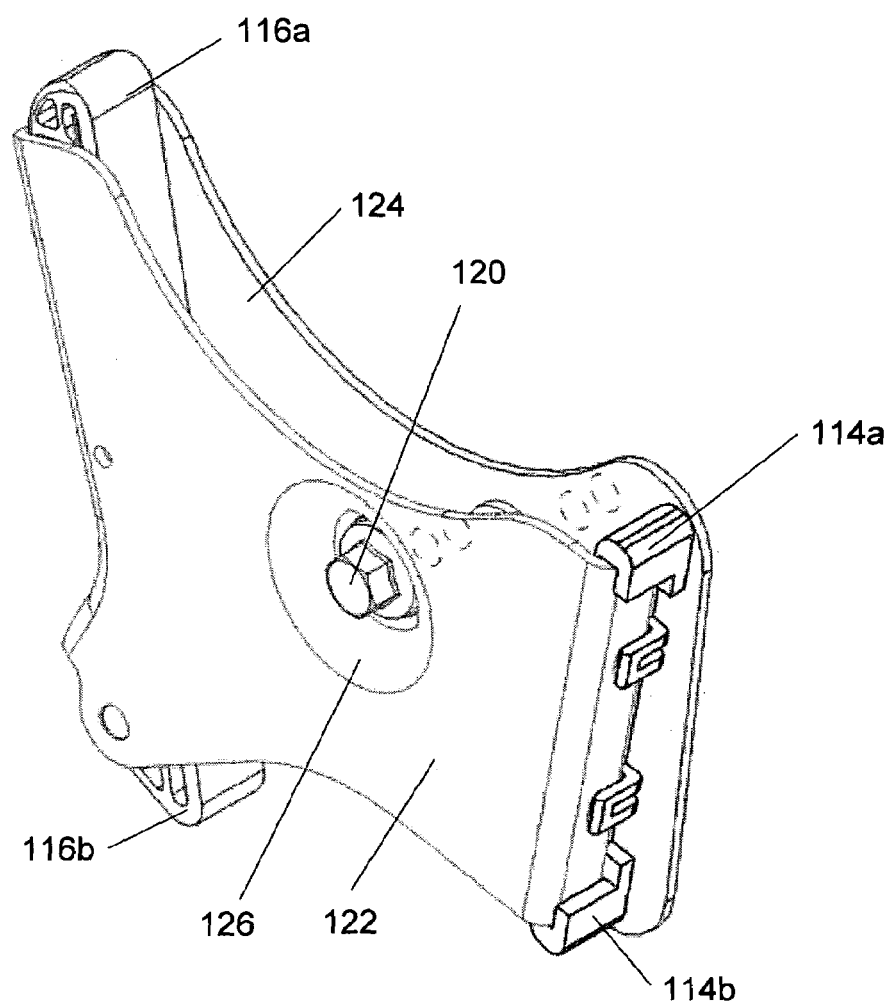
FIG. 5 shows a front perspective view of the dual brackets of the pivot control system.
Figure 6:
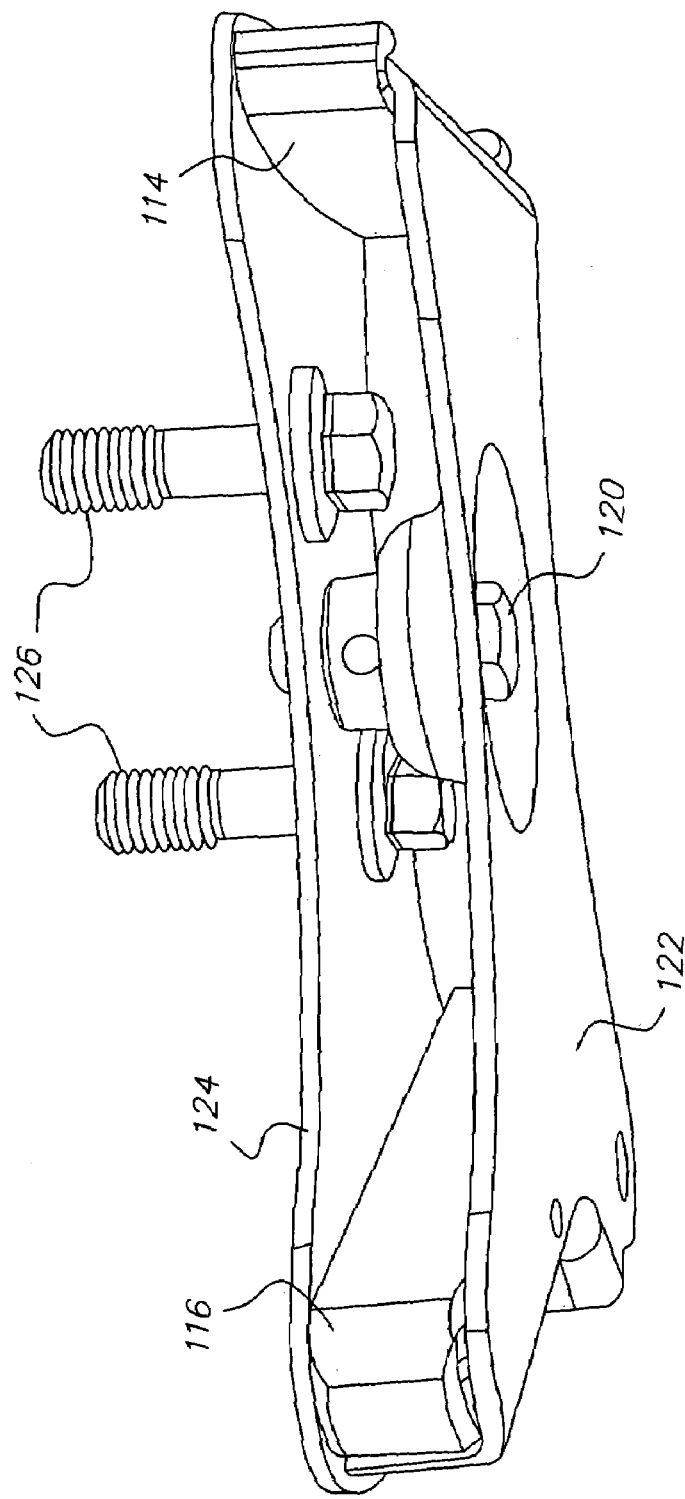
FIG. 6 shows a profile of the dual brackets of the pivot control system.
Figure 7:
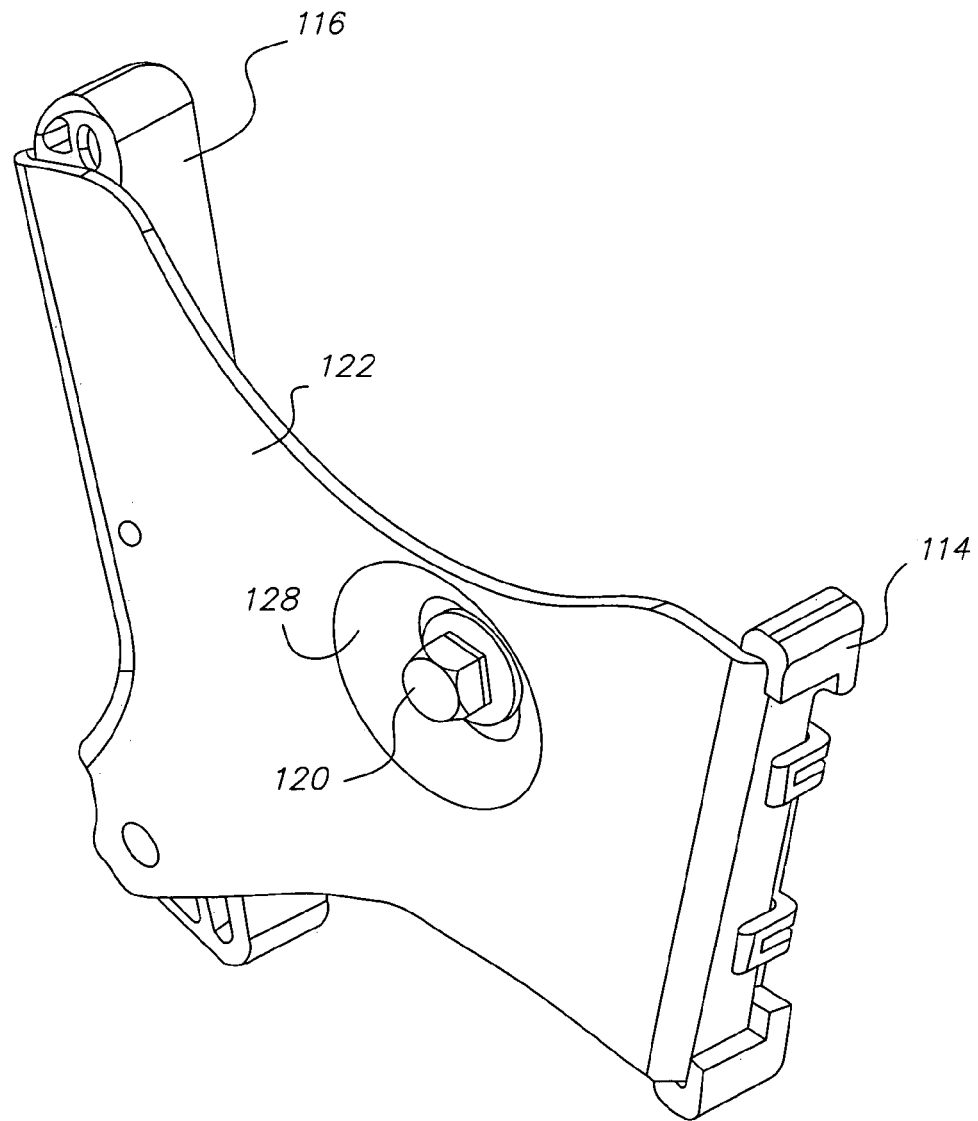
FIG. 7 shows a front perspective view of a first bracket plate of the dual bracket pivot control system.
Figure 8:
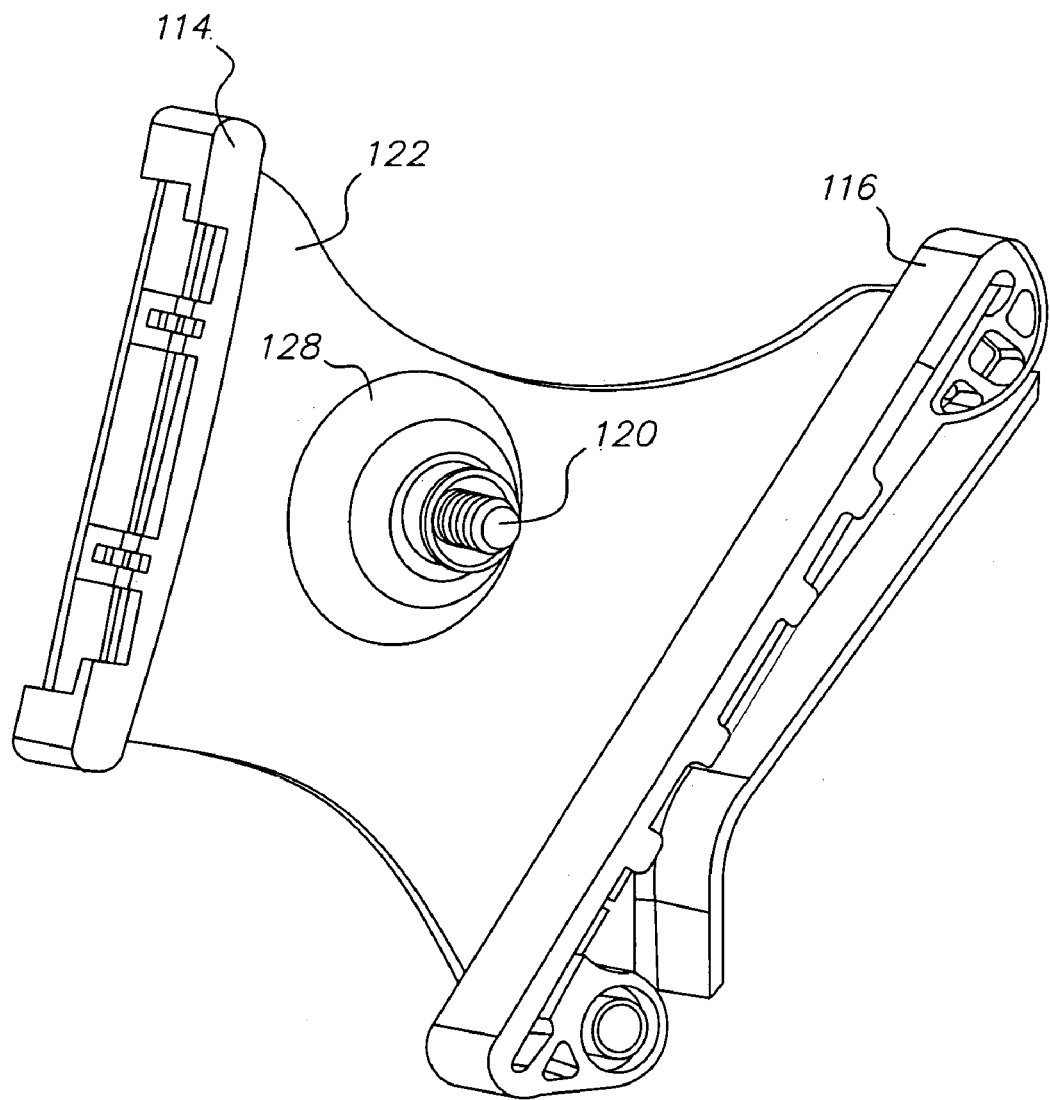
FIG. 8 shows a back perspective view of a first bracket plate of the dual bracket pivot control system.
Figure 9:
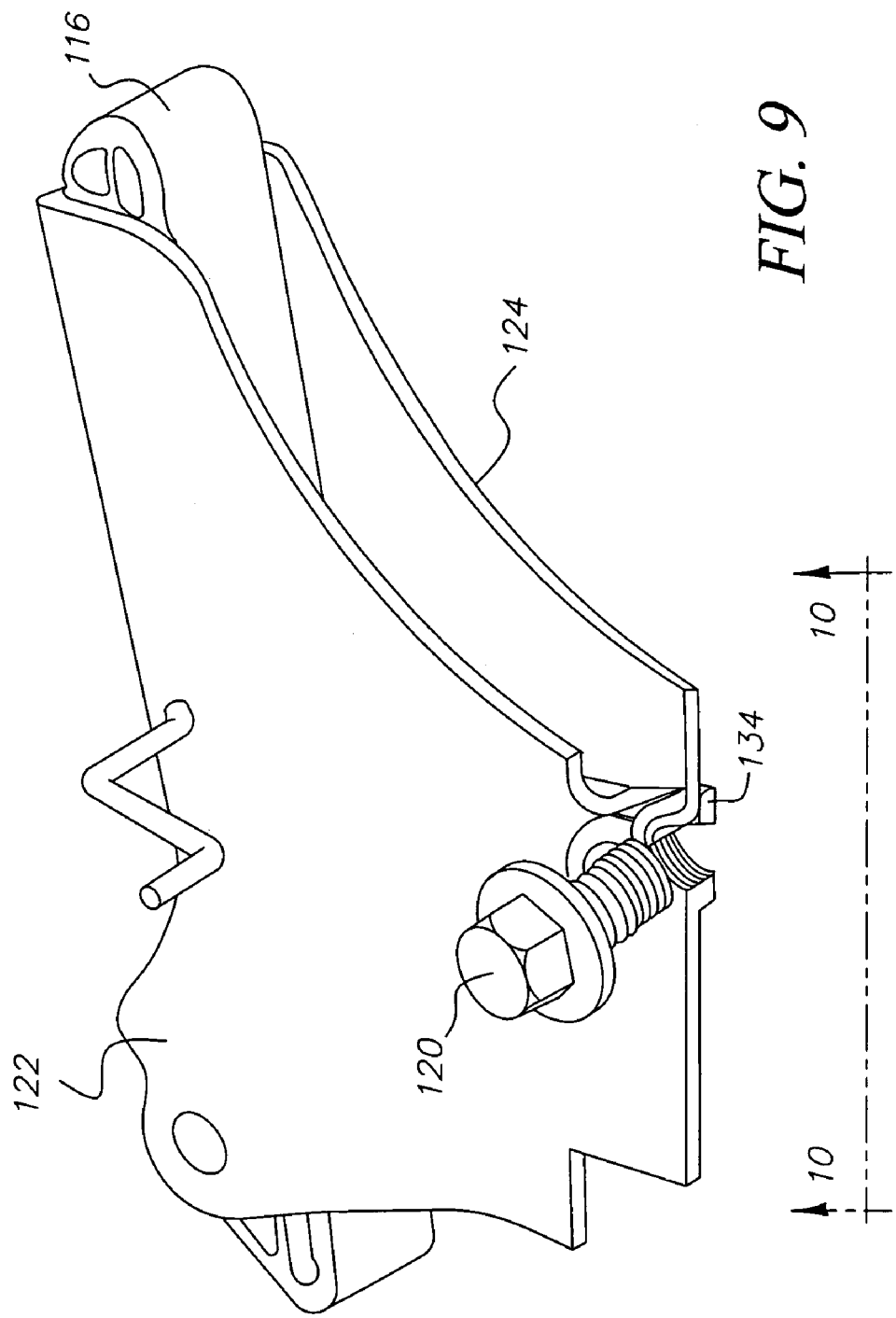
FIG. 9 shows a cut-away cross section of the dual bracket pivot control system.

In an alternative embodiment, dual bracket plates may be used in the pivot control system. Referring to FIG. 4, an endless chain loop 108 encloses and drivingly connects a driven sprocket 110 and a driving sprocket 112 with some distance between the two sprockets. On the tight strand of the chain is a guide 114 and on the slack strand of the chain is a tensioner 116. The guide 114 is rigidly fixed to a first bracket plate 122, while the tensioner 116 is only partially fixed to the first bracket plate 122. The tensioner 116 comprises a tensioner arm and a leaf spring (not shown) that rotates with the tensioner arm, which biases the tensioner arm's chain sliding face towards the outside of the endless chain loop. The guide 114, opposite the tensioner has a chain sliding face for contacting the outside of the chain loop.

The first bracket plate 122 as shown in FIGS. 5, 6, 7, and 8, has a central hole 128 on a center axis for receiving a screw 120. The second bracket plate 124, as shown in FIGS. 5, 6, 9 10, and 11 is fixedly attached to the engine block (not shown) with bolts 126, preferably cap screws and contains pivot 134 for receiving screw 120. The first bracket plate 122 fits directly in front of the second bracket 124, such that the pivot 134, integral to second bracket 124 receives screw 120.

As described in the previous embodiment, when the driving sprocket 112 or the driven sprocket 110 decelerates, the chain 108 will attempt to span the distance between the link of the chain in contact with the initiating sprocket to the other sprocket in the shortest distance, a straight line. The energy wave or high local load that results causes the end of the guide 114a, which is rigidly fixed to the first bracket plate 122 to move away from the tight strand of the chain 108. The movement of the end of the guide 114a causes the first bracket 122 to pivot clockwise relative to the second bracket plate 124, causing the end of the guide 114b to move towards the tight strand of the chain, the end of the tensioner 116b closest to the driving sprocket 112 to move away from the slack strand of the chain and the opposite end of the tensioner 116a, closest to the driven sprocket 110 to move towards the slack strand of the chain 108. The movement of the first bracket plate 122, relative to the second bracket plate 124 is achieved only when the screw 120 engages pivot 134 of the second bracket plate 124 and equalizes the energy between both ends of the guide and allows damping of the chain 108 to take place without compromising the tensioner 116. The specific movement of the ends of the guide and tensioner are not shown but are similar to those shown in FIGS. 2 and 3.

Similarly, if the high local load was received by the end of the tensioner 116b, closest to the driving sprocket 112 and caused the end of the tensioner to move away from the slack side of the chain, this in turn would cause the first bracket plate 122 to pivot clockwise relative to the second bracket plate 124 resulting in the opposite side of the tensioner 116a moving towards the slack strand of the chain, the end of the guide 114a, closest to the driven sprocket 110 to move away the tight strand of the chain, and the opposite side of the guide 114b to move towards from the tight strand of the chain.

When the driving sprocket 112 or the driven sprocket 110 accelerates, the chain 108 will attempt to span the distance between the link of the chain 108 in contact with the initiating sprocket to the other sprocket in the shortest distance possible, a straight line. The energy wave or high local load moves through the links of the chain until it comes to the end of guide 114, as in the prior art discussed above. However, unlike in the prior art, the energy causes the end of the guide 114b, which is rigidly fixed to the first bracket plate 122 to move away from the tight strand of the chain 108. The movement of the end of the guide 114b causes the first bracket plate 122 to pivot counterclockwise relative to the second bracket plate 124, causing the end of the guide 114a to move towards the tight strand of the chain, the end of the tensioner 116b closest to the driving sprocket 112 to move towards the slack strand of the chain and the opposite end of the tensioner 116a, closest to the driven sprocket 110 to move away from the slack strand of the chain 108. The movement of the first bracket plate 122, relative to the second bracket plate 124 is achieved only when the screw 120 engages pivot 134 of the second bracket plate 124 and equalizes the energy between both ends of the guide and allows damping of the chain 108 to take place without compromising the tensioner 116. The specific movement of the ends of the guide and tensioner are not shown but are similar to those shown in FIGS. 2 and 3.

Similarly, if the high local load was received by the end of the tensioner 116a, closest to the driven sprocket and caused the end of the tensioner to move away from the slack side of the chain, this in turn would cause the first bracket plate 122 to pivot counterclockwise relative to the second bracket plate 124, resulting in the opposite side of the tensioner 116b moving towards the slack strand of the chain, the end of the guide 114a, closest to the driven sprocket 110 to move towards the tight strand of the chain, and the opposite side of the guide 114b to move away from the tight strand of the chain.

For the above embodiments, any tensioner, mechanical or hydraulic may be used as long the tensioner arm and the means for forcing the tensioner arm to tension the chain rotate together.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pivoting chain guide and tensioner assembly for use with an endless chain loop drivingly connecting a driving sprocket to a driven sprocket comprising:
   at least one bracket plate for surrounding the chain at least partially between the driving sprocket and the driven sprocket, wherein the at least one bracket plate contains a receiving hole for a pivot at a center axis connecting the driving sprocket and the driven sprocket;
   a tensioner semi-rigidly attached to the at least one bracket plate comprising a tensioner arm with a chain sliding face extending a length of the tensioner arm for contacting the outside of the chain loop, and a biasing means that biases the tensioner arm towards the chain;
   a guide rigidly attached to the at least one bracket plate on opposite sides of the chain loop having a chain sliding face with a length for contacting the outside of the chain loop; and
   wherein the receiving hole for the pivot is located between strands of the endless chain loop and between the length of the chain sliding face of the tensioner arm and the length of the chain sliding face of the guide;
   wherein when a high local load or wave energy is applied to the chain, the high local load is received by an end of the guide forcing the guide to move away from the chain, such that the at least one bracket plate pivots on the pivot, moving the tensioner relative to the chain.

2. The pivoting chain guide and tensioner assembly of claim 1, wherein the at least one bracket plate pivots clockwise.

3. The pivoting chain guide and tensioner assembly of claim 2, wherein the pivoting of the at least one bracket plate is two degrees.

4. The pivoting chain guide and tensioner assembly of claim 1, wherein the at least one bracket plate pivots counterclockwise.

5. The pivoting chain guide and tensioner assembly of claim 4, wherein the pivoting of the at least one bracket plate is two degrees.

6. The pivoting chain guide and tensioner assembly of claim 1, further comprising a second bracket plate.

7. The pivoting chain guide and tensioner assembly of claim 6, wherein the second bracket plate contains holes for receiving bolts to fixedly attach to an engine.

8. The pivoting chain guide and tensioner assembly of claim 6, wherein the second bracket contains the pivot.

9. The pivoting chain guide and tensioner assembly of claim 6, wherein the at least one bracket plate pivots relative to the second bracket plate.

* * * * *